Nov. 8, 1932.  G. R. POWELL  1,887,428
VEHICLE BRAKING SYSTEM
Filed Aug. 2, 1928
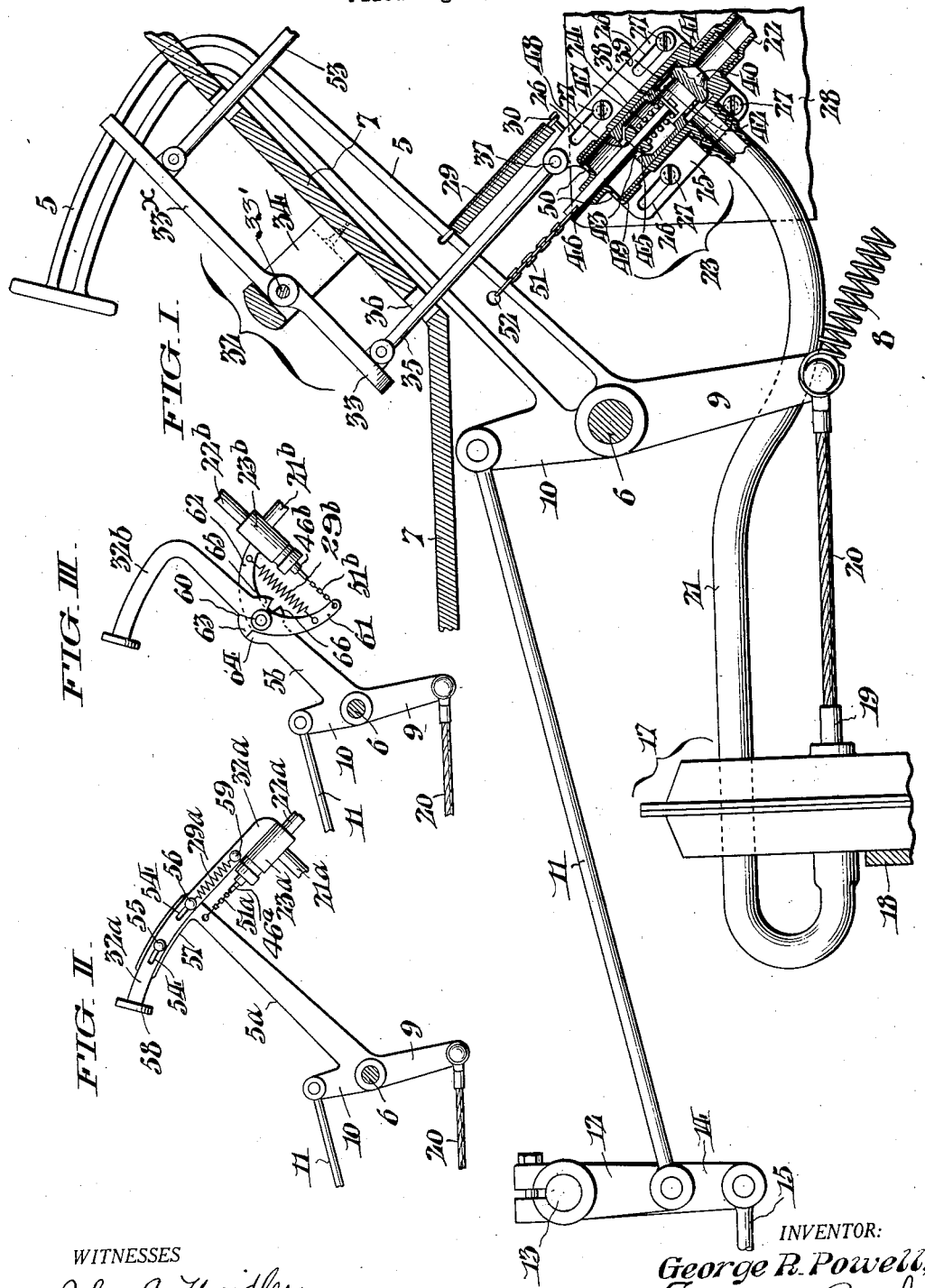
WITNESSES
John A. Weidler
William Bell
INVENTOR:
George R. Powell,
BY Fraley & Paul
ATTORNEYS.

Patented Nov. 8, 1932

1,887,428

UNITED STATES PATENT OFFICE

GEORGE R. POWELL, OF ROSEMONT, PENNSYLVANIA

VEHICLE BRAKING SYSTEM

Application filed August 2, 1928. Serial No. 296,884.

This invention relates to braking systems useful particularly in connection with automobiles. More specifically, it is concerned with brake systems involving use of auxiliary power means, energizable under fluid pressure influence, to minimize physical exertion incidental to making and maintaining brake applications. With auxiliary operating devices of the fluid pressure types as customarily designed heretofore, difficulty has been experienced in securing service applications without attendant irregular or spasmodic brake grippage and discomfort by jolting resulting from such cause.

My invention is directed toward overcoming the unsatisfactory condition just referred to through provision of auxiliary power means by aid of which a uniformly graduated brake application is obtainable in a manner simulative of manual operation, but with expenditure of very little energy on the part of the driver.

How the foregoing and other advantages can be readily realized in practice will be manifest from the detailed description which follows when taken in connection with the accompanying drawing. Fig. I is a fragmentary diagrammatic view partly in section and partly in elevation conveniently showing a mechanical vehicle brake system embodying my invention in one practical form.

Fig. II is a similar view, though somewhat more condensed and drawn to a smaller scale, showing an alternative form of my invention; and, Fig. III is a view resembling Fig. II but showing still another modification.

With reference first to Fig. I of these illustrations, 5 designates the master or brake pedal lever of a typical mechanical vehicle braking system, said lever being secured to a fixedly positioned rock-shaft 6 suitably journalled beneath the foot board 7. A spring 8, connected to a depending extremity 9 of the master lever 5, is retroactive upon the brake system and serves to normally hold the brakes released. In this instance the master lever 5 also has extending upward from its fulcrum boss, a short extremity 10 coupled by means of a link rod 11 with an oscillating arm 12 which is secured to a shaft 13 having journal support in fixed bearings, not shown. The shaft 13 also carries a pair of arms 14—one only being visible, each of which is coordinated by a link 15 with the brake bands on the wheels (not illustrated) of the vehicle in a well known manner.

As an auxiliary power operating means for the braking system I show, conventionally, in addition to other elements to be subsequently described, a suction responsive diaphragm device 17. This device 17 is rigidly secured to a fixed part 18 of the automobile chassis and has a plunger projection 19, which, through a flexible coupling 20 imparts motion to the depending extremity 9 of the master lever 5 for transmission by the latter direct to the braking mechanism in opposition to the spring 8. Interposed in flexible tubing 21, 22, extending between the diaphragm device 17 and a convenient source of vacuum associated with the automobile motor is a control device, comprehensively designated 23. This control device 23 is adapted for sliding movement in the direction of its axis, and to this end the cylindric body portion 24 thereof is provided with a base flange 25 having longitudinal motion limiting slots 26 at opposite sides that engage stationary guide studs or screws 27 taking into a fixed part 28 of the automobile, wherever found most convenient in practice. The body portion 24 of the control device 23 is normally held in the position shown with capacity for yielding to downward movement, by a helical spring 29 in tension between an anchorage 30 on the base flange 25 and the master lever 5. For the purpose of shifting the control device 23 in opposition to the spring 29 I employ, in the present instance, an element 32 independent of the master lever 5, said element having the form of an auxiliary pedal with heel and toe ends 33, 33x, respectively. These pedal ends 33, 33x are independently rockable on a common pivot 33' which is supported by a bracket 34 secured to the footboard 7. With its upper extremity pivoted to the heel end 33 of the auxiliary pedal 32, is a thrust rod 35 which passes through an opening 36 in the foot board 7, and has its lower end attached to the base flange 25 of the control device 23 at 37. The cylindric body portion 24 of the control device 23, is occupied by a piston 38 whereof one end is somewhat reduced in diameter with provision of a circumferential interspace 39 thereabout, said end being also tapered as at 40 for valvular action with a seat around a vacuum port 41 in communication with the tube 22. As shown, the piston 38 is hollow, and provided with lateral ports 42, communicating into the interspace 39, around its diametrically reduced end portion. At the opposite end, the piston 38 has an axial relief port 43 with a seat around its inner edge wherewith cooperates a valve member 45. This valve member 45 has capacity for sliding movement on a stem 46 in opposition to a compression spring 47, which normally keeps it yieldingly engaged with a stop shoulder 48 on said stem. A removable cap piece 49 closing the end of the cylindric body portion 24 of the control device 23, is provided with a number of vent apertures 50, and moreover affords a central bearing for the stem 46 whereof the protruding end is connected, by a chain or other flexible means 51, with the master lever 5 at 52. The toe end 33x of the auxiliary pedal 32 is conveniently co-ordinated by a rod connection 53 with the carburetor throttle—not shown—in the known manner.

Since the manual operation of the brake system under actuation of the master pedal 5 is well understood and obvious, further reference to it will be dispensed with and the description confined to control by the auxiliary pedal 32. In normal running of the automobile, pressure of the toe upon the end 33x of the auxiliary pedal 32 will result in gradual opening of the carburetor throttle exactly as with ordinary accelerator pedals. To apply the brakes, the heel end 33 of the auxiliary pedal 32 is depressed and movement imparted by the rod 35 to the cylindric body portion 24, of the control device 23, which is thus axially shifted in opposition to the spring 29 relative to the piston 38. As a result, the vacuum port 41 is opened and the relief port 43 closed through contact of the valve member 45 therewith, the valve spring 47 being concurrently placed under compression with the chain 51 absolutely taut. When the parts of the control device 23 occupy the new positions just described, it will be seen that communication is established between the diaphragm device 17 and the source of vacuum by way of the tube 22, 21 and circumferential interspace 39 within the cylindric body portion 24, with attendant impartation of motion to the various elements embodied in the brake mechanism including the master lever 5. Now, by virtue of the movement induced retroactively in the master lever 5 under the last noted conditions, the chain 51 is permitted to slack, thereby allowing the suction established by opening of the vacuum port 41 as explained above to draw the piston 38 downward to close said port 41, and at the same time permit the valve member 45 to move away slightly from the relief port 43. The vacuum tension in the diaphragm device 17 is accordingly relieved to a certain extent through communication established with the outside atmosphere via the apertures 50 in the cap piece 49, the hollow of the piston 38, the lateral ports 42, and the circumferential interspace 39 in the cylindric body portion 24 of the control device 23. Advantage of the tension decrease in the device 17 is however immediately taken up by the spring 8, which will tend to restore the brake system to the normal released position; but, at the very inception of such action, the piston 38 will again be lifted away from the vacuum port 41 with re-establishment of the condition previously described. In this way, the brake grippage is maintained at a definite degree for each successive position of the heel end 33, of the auxiliary pedal 32, with increase in the braking effect as said pedal end is depressed more and more until a point is reached when movement of the master lever 5 ceases altogether, the vacuum port 41 being thereby continuously held open while the relief port 43 is held closed and the maximum vacuum tension maintained in the device 17 as long as said pedal end 33 is maintained in fully depressed position. Thus with my invention it is possible, by graduated or incremental heel movement of the auxiliary pedal 32, to secure a service brake application (gradual deceleration of vehicular speed) devoid of sudden jambing or locking of the brakes. However, in emergencies as instantaneous or jambing brake action may be had by pushing the auxiliary pedal end 33 to the limit of its motion when the cylindric body portion 24 of the control device 23, is so far advanced as to render impossible following up of the piston 38 for relief action in the manner above described.

Advantages corresponding in all respects to those hereinbefore pointed out may be secured with the alternative embodiment of my invention shown in Fig. II. Here the auxiliary pedal 32 of the first form is entirely dispensed with, and the master pedal lever 5a supplemented with an actuating element or component 32a. This component 32a is independently movable, that is to say, slidable to an extent limited by slots 54 therein in engagement with guide studs 55, 56 let into the arcuate portion 57 of the master pedal lever 5a. At one end, the component 32a is provided with a foot pad 58; while to its opposite end is secured a device 23a which is identical in construction with the device 23 of the previous embodiment. Pressure of the foot on the component 32a is yieldingly resisted by a spring 29a in tension between the stud 56 and a stud 59 on said component. As before described, the valve actuating stem 46a of the device 23a is connected by a chain 51a to the master pedal lever 5a. Thus, by pressure of the foot on the pad 58, the actuating component 32a is shifted independently of the master pedal lever 5a (this action being possible through the yielding of the spring 29a) thereby carrying the control device 23a away from said lever 5a and inducing a pull on the chain 51a, with resultant actuation of the brake mechanism in a manner precisely as explained in connection with the first described embodiment. It will, of course, be readily understood that, if desired, connection of the device 23a to the lever 5a, as well as the chain 51a to the component 32a may be resorted to without interfering with the functioning of the respective parts.

In the further embodiment of my invention depicted in Fig. III, the master control lever is designated 5b, and, as in the form of Fig. II, it is provided with an attached actuating element or component 32b which however, is pivotally secured thereto at 60 instead of being relatively slidable. As shown, the component 32b has a downward actuating extremity 61, and the master pedal lever 5b a complemental downward arcuate extremity 62. A spring 29b in tension between these arcuate extremities 61, 62 normally holds the component 32b in the position illustrated, with a lug 63 thereon in abutment with an opposing stop lug 64 on the master pedal lever 5b. The independent motion of the component 32b is on the other hand limited through cooperation of an integral lug 65 thereon with a second opposing lug 66 on the master lever 5b. A control device 23b, also identical in construction with the device 23 of the first described embodiment, is secured to the arcuate extremity 62 of the master lever 5b; while the chain 51b of the valve stem 46b of said device is connected to the extremity 61 of the component 32b. In operation, pressure of the foot causes the component 32b to be swung independently about the pivot 60 against the spring 29b, with attendant relative movement as between the cylindric body portion of the control device 23b and its valve piston under pull of the chain 51b to effect brake application by "following up" action of the master lever 5b as already understood.

From the foregoing, it will be apparent that I have provided a very simple vehicle braking system with auxiliary power operating means controlled through differential action between the master pedal lever of the brake mechanism and an independently movable actuating element; which, as in the form of Fig. I, may be separate from said master lever; or, as in Figs. II and III, arranged as a supplemental component thereof.

Having thus described my invention, I claim:

1. In braking mechanism for vehicles including a power actuator and an operatively-connected master pedal-lever, the combination of a control device interposed between the actuator and a source of power, said control device embodying a casing capable of axial movement and having a vacuum port, a piston valve normally closing the vacuum port and having a flexible connection to the master pedal-lever, and means whereby the casing aforesaid may be axially moved relative to the piston valve to effect operation of the actuator with attendant differential applications of braking pressure.

2. In braking mechanism for vehicles including a suction-responsive actuator and an operatively-connected master pedal-lever, the combination of a control device interposed between the actuator and a source of power, said control device embodying a cylindrical casing capable of axially longitudinal movement and having an inlet port, a hollow piston valve normally closing the power inlet port and having a flexible connection to the master pedal-lever, and an auxiliary pedal movable independently of the master pedal-lever whereby the casing aforesaid may be axially moved relative to the piston valve to effect operation of the actuator with attendant differential applications of braking pressure.

3. In braking mechanism for vehicles including a suction-responsive diaphragm-device and an operatively-connected master brake-pedal lever, the combination of a control means interposed between the diaphragm-device and a source of vacuum, said control means embodying a cylindrical body capable of sliding movement in the direction of its axis, a piston valve having a reduced portion providing an interspace thereabout and a tapered end for valvular cooperation with a vacuum port in the adjoining end of the cylindrical body, a flexible connection between said piston valve and the master brake-pedal lever, and means whereby the casing aforesaid may be axially moved relative to the piston valve to effect operation of the diaphragm-device with attendant differential applications of braking pressure.

4. In braking mechanism for vehicles including a suction-responsive diaphragm-device and an operatively-connected master brake-pedal lever, the combination of a control means interposed between the diaphragm-device and a source of vacuum, said control means embodying a cylindrical body capable of limited sliding movement in opposition to spring influence in the direction of its axis, a hollow piston valve having a reduced portion with lateral ports affording communication into the interspace thereabout and a tapered end for valvular cooperation with the seat around a vacuum port provided in the adjoining end of the cylindrical body, an axial relief port in the other end of the piston with which cooperates a valve member mounted on a stem and having capacity for limited spring-opposed sliding movement relative thereto, said stem being flexibly connected to the master brake-pedal lever, and an auxiliary pedal movable independently of the master pedal-lever whereby the cylindrical body aforesaid may be axially moved relative to the piston valve to effect operation of the diaphragm-device with attendant differential applications of braking pressure.

5. In mechanical vehicle braking mechanism including a master brake-pedal lever and operatively-connected suction responsive device, the combination of an auxiliary actuator pedal movable independently of the master lever, and a control device interposed between the suction responsive device and a source of vacuum, said control device embodying a casing with a vacuum port, means directly connecting the casing to the auxiliary pedal element, a piston valve normally closing the vacuum port and coupled by a flexible connection to the master lever whereby, through differential action between said master lever and the auxiliary pedal, the casing aforesaid is moved relative to the piston valve with attendant opening of the vacuum port for exhaust of the suction responsive device and operation of the mechanism to apply braking pressure.

6. In mechanical vehicle braking mechanism including a master brake-pedal lever and operatively-connected suction responsive device, the combination of an auxiliary actuator pedal element movable independently of the master lever, a suction responsive device, a control device including a casing operatively connected with the auxiliary pedal, a hollow piston in the casing affording communication to the suction responsive device and having an axially-located relief port, a stem carrying a valve member for cooperation with the relief port and normally engaging a stop shoulder on said stem under the influence of a spring by which such valve member is permitted to yield, and flexible means connecting said stem with the master lever whereby, through differential action between the master lever and the independently movable pedal element, exhaust and atmospheric relief of the suction responsive device is secured with gradual increase of vacuum tension in said device and corresponding amplification of braking pressure progressively with movement of the auxiliary pedal element.

In testimony whereof, I have hereunto signed my name at Philadelphia, Pennsylvania, this 30th day of July, 1928.

GEORGE R. POWELL.